United States Patent
Mackie et al.

(10) Patent No.: US 11,469,958 B1
(45) Date of Patent: Oct. 11, 2022

(54) NETWORK CONTROLLER DEPLOYMENT

(71) Applicant: Juniper Networks, Inc., Sunnyvale, CA (US)

(72) Inventors: William Stuart Mackie, Carmel, NY (US); Danil Zhigalin, Dusseldorf (DE)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/249,286

(22) Filed: Feb. 25, 2021

(51) Int. Cl.
| | |
|---|---|
| *H04L 41/0893* | (2022.01) |
| *H04L 67/00* | (2022.01) |
| *H04L 61/2503* | (2022.01) |
| *H04L 41/0806* | (2022.01) |
| *H04L 41/085* | (2022.01) |
| *H04L 45/76* | (2022.01) |
| *H04L 43/20* | (2022.01) |
| *H04L 67/10* | (2022.01) |

(52) U.S. Cl.
CPC ........ *H04L 41/0893* (2013.01); *H04L 41/085* (2013.01); *H04L 41/0806* (2013.01); *H04L 43/20* (2022.05); *H04L 45/76* (2022.05); *H04L 61/2503* (2013.01); *H04L 67/10* (2013.01); *H04L 67/34* (2013.01)

(58) Field of Classification Search
CPC ....... H04L 41/08; H04L 41/0893–0895; H04L 41/12–122; H04L 43/20; H04L 43/08; H04L 45/036; H04L 45/76; H04L 49/60–608; H04L 67/10
See application file for complete search history.

(56) References Cited

U.S. PATENT DOCUMENTS

| | | | |
|---|---|---|---|
| 9,571,394 B1 | 2/2017 | Sivaramakrishnan et al. | |
| 10,565,001 B2* | 2/2020 | Nakil | H04L 43/10 |
| 10,599,458 B2* | 3/2020 | Variath | G06F 9/45558 |

(Continued)

FOREIGN PATENT DOCUMENTS

| | | | | |
|---|---|---|---|---|
| WO | 2013/184846 A1 | 12/2013 | | |
| WO | WO-2017108119 A1 * | 6/2017 | ........... | G06F 9/5066 |

OTHER PUBLICATIONS

"Reference Architecture for Contrail Cloud," Release 13.1 and 13.2, Juniper Networks, Inc., published Sep. 2, 2020, 114 pp.

*Primary Examiner* — Brendan Y Higa
(74) *Attorney, Agent, or Firm* — Shumaker & Sieffert, P.A.

(57) ABSTRACT

A method for configuring a fabric managed by a software-defined networking (SDN) controller includes, with a first control host installed in a first rack having a first management switch and a second control host installed in a second rack, executing controller nodes that implement an SDN controller using a controller virtual network extending between the first rack and the second rack. The first management switch is configured to route traffic between the controller virtual network and a device management network extending from the first management switch to a fabric network device of the fabric managed by the SDN controller. The method further includes configuring, with the SDN controller, via the first management switch, the fabric network device with the controller virtual network to enable communications, via the controller virtual network, between the first control host and a compute node or a storage node connected to the fabric network device.

20 Claims, 14 Drawing Sheets

(56) References Cited

U.S. PATENT DOCUMENTS

| | | | |
|---|---|---|---|
| 10,686,871 B1* | 6/2020 | Taaghol | H04L 41/0803 |
| 11,050,586 B2* | 6/2021 | Huang | H04L 45/04 |
| 11,171,834 B1* | 11/2021 | Bockelmann | G06F 9/45558 |
| 2013/0329548 A1* | 12/2013 | Nakil | H04L 41/12 370/228 |
| 2014/0129700 A1* | 5/2014 | Mehta | H04L 67/10 709/224 |
| 2015/0244617 A1* | 8/2015 | Nakil | G06F 11/07 709/224 |
| 2016/0149795 A1* | 5/2016 | Kang | H04L 45/64 370/254 |
| 2017/0180213 A1* | 6/2017 | Li | H04L 41/20 |
| 2018/0124254 A1* | 5/2018 | Shaw | H04L 12/1417 |
| 2020/0162377 A1* | 5/2020 | Sarva | H04L 41/14 |
| 2020/0344124 A1* | 10/2020 | Christober | H04L 41/0806 |
| 2020/0344146 A1* | 10/2020 | Roberts | H04L 45/04 |
| 2020/0344147 A1* | 10/2020 | Pianigiani | H04L 45/64 |
| 2020/0396176 A1* | 12/2020 | Lochhead | H04L 41/0803 |
| 2021/0144087 A1* | 5/2021 | Tandon | H04L 12/4641 |
| 2021/0168028 A1* | 6/2021 | Kapur | H04L 49/25 |
| 2021/0176347 A1* | 6/2021 | Goel | H04L 47/18 |
| 2021/0314388 A1* | 10/2021 | Zhou | H04L 63/0218 |
| 2021/0377113 A1* | 12/2021 | Pianigiani | H04L 49/25 |
| 2021/0377164 A1* | 12/2021 | Sanghvi | H04L 49/70 |

* cited by examiner

NETWORK CONTROLLER DEPLOYMENT

TECHNICAL FIELD

The disclosure relates to a virtualized computing infrastructure and, more specifically, to configuring network connectivity for a virtualized computing infrastructure.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Virtualized data centers are becoming a core foundation of the modern information technology (IT) infrastructure. In particular, modern data centers have extensively utilized virtualized environments in which virtual hosts, also referred to herein as virtual execution elements, such virtual machines or containers, are deployed and executed on an underlying compute platform of physical computing devices.

Virtualization within a data center can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the computing infrastructure. As physical computing resources become fungible resources, such as in a cloud-based computing environment, provisioning and management of the computing infrastructure becomes easier. Thus, enterprise IT staff often prefer virtualized compute clusters in data centers for their management advantages in addition to the efficiency and increased return on investment (ROI) that virtualization provides.

Containerization is a virtualization scheme based on operation system-level virtualization. Containers are lightweight and portable execution elements for applications that are isolated from one another and from the host. Because containers are not tightly-coupled to the host hardware computing environment, an application can be tied to a container image and executed as a single light-weight package on any host or virtual host that supports the underlying container architecture. As such, containers address the problem of how to make software work in different computing environments. Containers offer the promise of running consistently from one computing environment to another, virtual or physical.

With containers' inherently lightweight nature, a single host can often support many more container instances than traditional virtual machines (VMs). Often short-lived, containers can be created and moved more efficiently than VMs, and they can also be managed as groups of logically-related elements (sometimes referred to as "pods" for some orchestration platforms, e.g., Kubernetes). These container characteristics impact the requirements for container networking solutions: the network should be agile and scalable. VMs, containers, and bare metal servers may need to coexist in the same computing environment, with communication enabled among the diverse deployments of applications. The container network should also be agnostic to work with the multiple types of orchestration platforms that are used to deploy containerized applications.

A computing infrastructure that manages deployment and infrastructure for application execution may involve two main roles: (1) orchestration—for automating deployment, scaling, and operations of applications across clusters of hosts and providing computing infrastructure, which may include container-centric computing infrastructure; and (2) network management—for creating virtual networks in the network infrastructure to enable packetized communication among applications running on virtual execution environments, such as containers or VMs, as well as among applications running on legacy (e.g., physical) environments. Software-defined networking contributes to network management.

SUMMARY

In general, techniques are described for configuring a software-defined networking (SDN) controller, implemented on multiple racks (e.g., 2 or 3 racks), to deploy into a fabric managed by the SDN controller itself. For example, a first control host installed in a first rack having a first management switch and a second control host installed in a second rack may execute controller nodes that implement the SDN controller using a controller virtual network extending between the first rack and the second rack. In this example, the first management switch may be configured to route traffic between the controller virtual network and a device management network extending from the first management switch to a fabric network device (e.g., a leaf switch) of the fabric managed by the SDN controller. For instance, the first management switch may be configured to perform virtual routing and forwarding (VRF) to route traffic between the controller virtual network and the device management network and to use a dynamic host configuration protocol (DHCP) relay to assign an Internet protocol (IP) address to the fabric network device.

In this example, the SDN controller may configure the fabric network device to enable communications, via the controller virtual network, between the first control host and a compute node or a storage node connected to the fabric network device. For instance, the SDN controller may configure, using a management port of the fabric network device, the fabric network device to route traffic using an integrated routing and bridging (IRB) interface. After configuring the fabric network device, the SDN controller may configure the compute node and/or the storage node by communicating with such nodes via the fabric network device. In this way, the SDN controller may configure the fabric network device used to support the SDN controller itself, which may allow the SDN controller to further customize the virtual network to support the SDN controller.

The described techniques may provide one or more technical improvements that realize at least one practical application. For example, customizing the virtual network to support the SDN controller may improve a performance of the SDN controller itself and/or improve a performance of the virtual network managed by the SDN controller. As another example, rather than relying on an existing SDN controller to configure a fabric network device to support a SDN controller, techniques described herein permit a single SDN controller to configure its own the fabric network device to support the SDN controller.

In one example, this disclosure describes a method for configuring a fabric managed by an SDN controller includes with a first control host installed in a first rack having a first management switch and a second control host installed in a second rack, executing controller nodes that implement an SDN controller using a controller virtual network extending between the first rack and the second rack, wherein the first management switch is configured to route traffic between the controller virtual network and a device management network extending from the first management switch to a fabric network device of the fabric managed by the SDN controller; and configuring, with the SDN controller, via the first management switch, the fabric network device with the controller virtual network to enable communications, via the controller virtual network, between the first control host and a compute node or a storage node connected to the fabric network device.

In another example, this disclosure describes a system for configuring a fabric managed by an SDN controller includes a first control host installed in a first rack; a second control host installed in a second rack, wherein the first control host and the second control host are configured to execute controller nodes that implement an SDN controller using a controller virtual network extending between the first rack and the second rack; a first management switch installed in the first rack, wherein the first management switch is configured to route traffic between the controller virtual network and a device management network extending from the first management switch to a fabric network device of the fabric managed by the SDN controller; and wherein the SDN controller is configured to configure, via the first management switch, the fabric network device with the controller virtual network to enable communications, via the controller virtual network, between the first control host and a compute node or a storage node connected to the fabric network device.

In another example, this disclosure describes a non-transitory computer-readable medium comprising instructions for causing one or more processors to: with a first control host installed in a first rack having a first management switch and a second control host installed in a second rack, execute controller nodes that implement an SDN controller using a controller virtual network extending between the first rack and the second rack, wherein the first management switch is configured to route traffic between the controller virtual network and a device management network extending from the first management switch to a fabric network device of the fabric managed by the SDN controller; and configure, with the SDN controller, via the first management switch, the fabric network device with the controller virtual network to enable communications, via the controller virtual network, between the first control host and a compute node or a storage node connected to the fabric network device.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
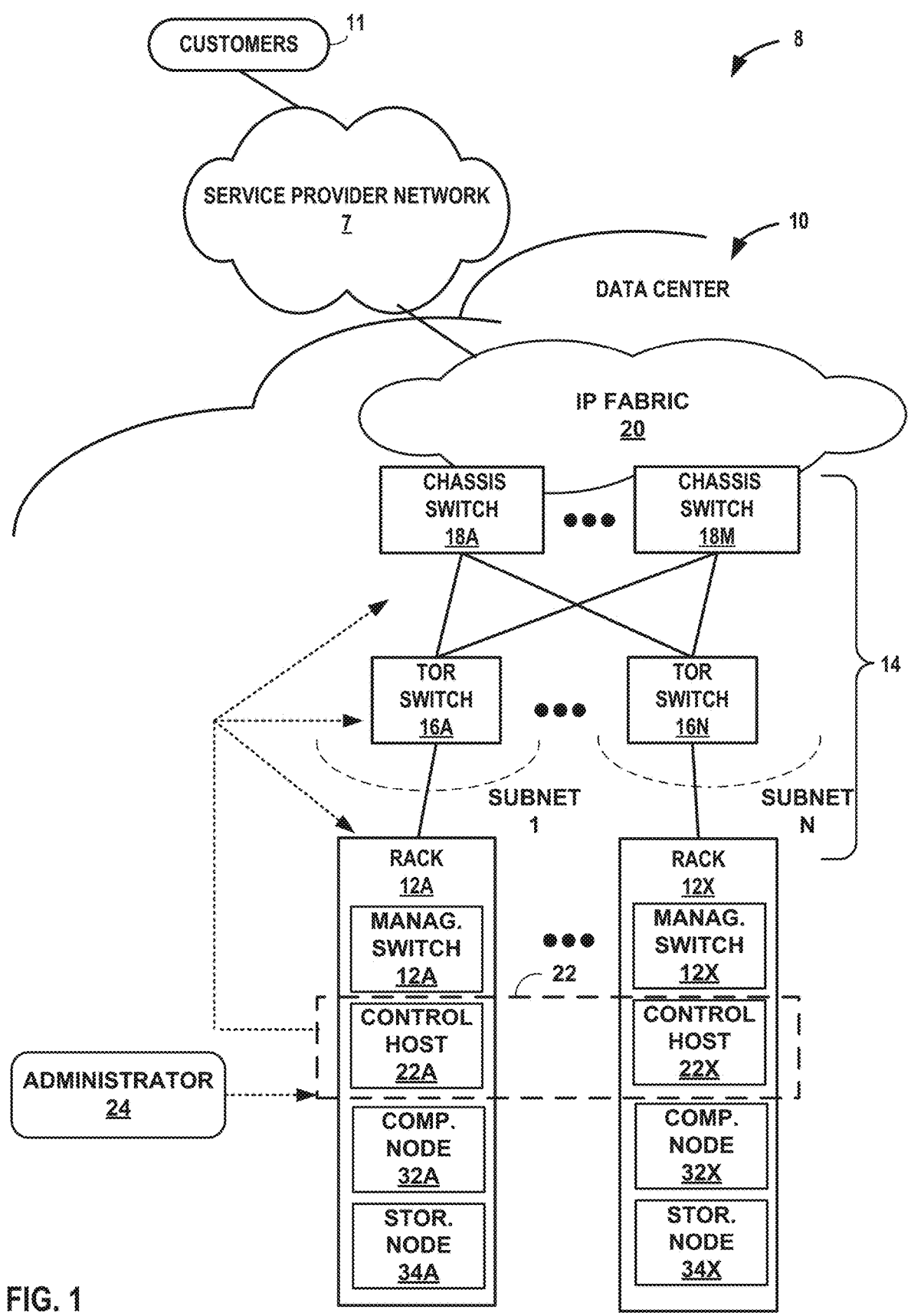
FIG. 1 is a block diagram illustrating an example network having a data center, in accordance with the techniques of the disclosure.

FIG. 1 is a block diagram illustrating an example network system 8 in which examples of the techniques described herein may be implemented. In general, data center 10 provides an operating environment for applications and services for a customer sites 11 (illustrated as "customers 11") having one or more customer networks coupled to the data center by service provider network 7. Data center 10 may, for example, host infrastructure equipment, such as networking and storage systems, redundant power supplies, and environmental controls. Service provider network 7 is coupled to public network 15, which may represent one or more networks administered by other providers, and may thus form part of a large-scale public network infrastructure, e.g., the Internet. Public network 15 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 7, an enterprise IP network, or some combination thereof.

Although customer sites 11 and public network 15 are illustrated and described primarily as edge networks of service provider network 7, in some examples, one or more of customer sites 11 and public network 15 may be tenant networks within data center 10 or another data center. For example, data center 10 may host multiple tenants (customers) each associated with one or more virtual private networks (VPNs), each of which may be connected with one of customer sites 11.

Service provider network 7 offers packet-based connectivity to attached customer sites 11, data center 10, and public network 15. Service provider network 7 may represent a network that is owned and operated by a service provider to interconnect a plurality of networks. Service provider network 7 may implement Multi-Protocol Label Switching (MPLS) forwarding and in such instances may be referred to as an MPLS network or MPLS backbone. In some instances, service provider network 7 represents a plurality of interconnected autonomous systems, such as the Internet, that offers services from one or more service providers.

In some examples, data center 10 may represent one of many geographically distributed network data centers. As illustrated in the example of FIG. 1, data center 10 may be a facility that provides network services for customers. A customer of the service provider may be a collective entity such as enterprises and governments or individuals. For example, a network data center may host web services for several enterprises and end users. Other exemplary services may include data storage, virtual private networks, traffic engineering, file service, data mining, scientific- or supercomputing, and so on. Although illustrated as a separate edge network of service provider network 7, elements of data center 10 such as one or more physical network functions (PNFs) or virtualized network functions (VNFs) may be included within the service provider network 7 core.

In this example, data center 10 includes storage nodes and/or compute nodes interconnected via switch fabric 14 provided by one or more tiers of physical network switches and routers, with racks 12A-12X (herein. "racks 12") depicted as coupled to top-of-rack (TOR) switches 16A-16X. Racks 12 are computing devices and may also be referred to herein as "servers," "hosts," or "host devices." TOR switches 16 may be located in respective racks 12.

Switch fabric 14 in the illustrated example includes interconnected top-of-rack (TOR) (or "leaf") switches 16A-16N (collectively, "TOR switches 16") coupled to a distribution layer of chassis (or "spine" or "core") switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center 10 may also include one or more physical network functions (PNFs) such as physical firewalls, load balancers, routers, route reflectors, broadband network gateways (BNGs), Evolved Packet Cores or other cellular network elements, and other PNFs.

In this example, TOR switches 16 and chassis switches 18 provide racks 12 with connectivity to IP fabric 20 and service provider network 7. Chassis switches 18 aggregate traffic flows and provides connectivity between TOR switches 16. TOR switches 16 may be fabric devices that provide layer 2 (MAC) and/or layer 3 (e.g., IP) routing and/or switching functionality. TOR switches 16 and chassis switches 18 may each include one or more processors and a memory and can execute one or more software processes. Chassis switches 18 are coupled to IP fabric 20, which may perform layer 3 routing to route network traffic between data center 10 and customer sites 11 by service provider network 7. The switching architecture of data center 10 is merely an example. Other switching architectures may have more or fewer switching layers, for instance. For example, IP fabric 20 may include one or more gateway routers.

The term "packet flow," "traffic flow," or simply "flow" refers to a set of packets originating from a particular source device or endpoint and sent to a particular destination device or endpoint. A single flow of packets may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Each of racks 12 may include a combination of one or more switches, one or more compute servers (or "nodes"), or one or more storage servers (or "nodes"). Any server of racks 12 may be configured with virtual execution elements by virtualizing resources of the server to provide an isolation among one or more processes (applications) executing on the server. "Hypervisor-based" or "hardware-level" or "platform" virtualization refers to the creation of virtual machines that each includes a guest operating system for executing one or more processes. In general, a virtual machine provides a virtualized/guest operating system for executing applications in an isolated virtual environment. Because a virtual machine is virtualized from physical hardware of the host server, executing applications are isolated from both the hardware of the host and other virtual machines. Each virtual machine may be configured with one or more virtual network interfaces for communicating on corresponding virtual networks.

Virtual networks are logical constructs implemented on top of the physical networks. Virtual networks may include virtual LANs or VxLANs, for instance. Some types of virtual networks may be used to replace ULAN-based isolation and provide multi-tenancy in a virtualized data center, e.g., data center 10. Each tenant or an application can have one or more virtual networks. Each virtual network may be isolated from all the other virtual networks unless explicitly allowed by security policy.

Virtual networks can be connected to, and extended across physical Multi-Protocol Label Switching (MPLS) Layer 3 Virtual Private Networks (L3VPNs) and Ethernet Virtual Private Networks (EVPNs) networks using a data center 10 edge router (not shown in FIG. 1). Virtual networks may also be used to implement. Network Function Virtualization (NFV) and service chaining.

Virtual networks can be implemented using a variety of mechanisms. For example and as noted above, each virtual network could be implemented as a Virtual Local Area Network (VLAN), Virtual Private Networks (VPN), etc. A virtual network can also be implemented using two networks—the physical underlay network made up of IP fabric 20 and switching fabric 14 and a virtual overlay network. The role of the physical underlay network is to provide a switching fabric that provides L2/L3 connectivity from any physical device (server, storage device, router, or switch) to any other physical device. In some examples, the underlay network may provide uniform low-latency, non-blocking, high-bandwidth connectivity from any point in the network to any other point in the network.

Virtual routers running in the kernels or hypervisors of racks 12 may create a virtual overlay network on top of the physical underlay network using a mesh of dynamic "tunnels" amongst themselves. These overlay tunnels can be MPLS over GRE/UDP tunnels, or VxLAN tunnels, or NVGRE tunnels, for instance. The underlay physical routers and switches may not contain any per-tenant state for virtual machines or other virtual execution elements, such as any Media Access Control (MAC) addresses, IP address, or policies. The forwarding tables of the underlay physical routers and switches may, for example, only contain the IP prefixes or MAC addresses of the physical racks 12. (Gateway routers or switches that connect a virtual network to a physical network are an exception and may contain tenant MAC or IP addresses.)

Control hosts 17A-17X may execute controller nodes that implement a distributed network controller 22 for managing switch fabric 14 and connectivity among physical network endpoints and virtual network endpoints attached to switch fabric. Such physical network endpoints may include control hosts 17, compute nodes 32, and storage nodes 34. The control plane protocol between the control plane nodes of the network controller 22 or a physical gateway router (or switch) may be BGP (and may be Netconf for management). This is the same control plane protocol may also be used for MPLS L3VPNs and MPLS EVPNs. The protocol between the network controller 22 and virtual routers may be based on XMPP, for instance.

"Container-based" or "operating system" virtualization refers to the virtualization of an operating system to run multiple isolated systems on a single machine (virtual or physical). Such isolated systems represent containers, such as those provided by the open-source DOCKER Container application or by CoreOS Rkt ("Rocket"). Like a virtual machine, each container is virtualized and may remain isolated from the host machine and other containers. However, unlike a virtual machine, each container may omit an individual operating system and provide only an application suite and application-specific libraries. In general, a container is executed by the host machine as an isolated user-space instance and may share an operating system and common libraries with other containers executing on the host machine. Thus, containers may require less processing power, storage, and network resources than virtual machines. A group of one or more containers may be configured to share one or more virtual network interfaces for communicating on corresponding virtual networks.

In some examples, containers are managed by their host kernel to allow limitation and prioritization of resources (CPU, memory, block I/O, network, etc.) without the need for starting any virtual machines, in some cases using namespace isolation functionality that allows complete isolation of an application's (e.g., a given container) view of the operating environment, including process trees, networking, user identifiers and mounted file systems. In some examples, containers may be deployed according to Linux Containers (LXC), an operating-system-level virtualization method for running multiple isolated Linux systems (containers) on a control host using a single Linux kernel. LXC is an operating-system-level virtualization method for running multiple isolated Linux systems (containers) on a single control host (LXC host). An LXC does not use a virtual machine (although an LXC may be hosted by a virtual machine). Instead, an LXC uses a virtual environment with its own CPU, memory, block I/O, network, and/or other resource space. The LXC resource control mechanism is provided by namespaces and cgroups in the Linux kernel on the LXC host. Additional information regarding containers is found in "Docker Overview," Docker, Inc., available at docs.docker.com/engine/understanding-docker, last accessed Jul. 9, 2016. Additional examples of containerization methods include OpenVZ, FreeBSD jail, AIX Workload partitions, and Solaris containers. Accordingly, as used herein, the term "containers" may encompass not only LXC-style containers but also any one or more of virtualization engines, virtual private servers, silos, or jails.

Compute nodes 32 may host virtual network endpoints for one or more virtual networks that operate over the physical network represented here by IP fabric 20 and switch fabric 14. Although described primarily with respect to a data center-based switching network, other physical networks, such as service provider network 7, may underlay portions of the one or more virtual networks. A virtual network endpoint for a virtual network may represent one or more virtual execution elements that share a virtual network interface for the virtual network. For example, a virtual network endpoint may be a virtual machine, a set of one or more containers (e.g., a pod), or another other virtual execution element(s), such as a layer 3 endpoint for a virtual network. The term "virtual execution element" encompasses virtual machines, containers, and other virtualized computing resources that provide an at least partially independent execution environment for applications. The term "virtual execution element" may also encompass a pod of one or more containers. Each on of racks 12 may execute as many virtual execution elements as is practical given hardware resource limitations of each respective one of the racks 12. Each of the virtual network endpoints may use one or more virtual network interfaces to perform packet I/O or otherwise process a packet. For example, a virtual network endpoint may use one virtual hardware component (e.g., an SR-IOV virtual function) enabled by a network interface card to perform packet I/O and receive/send packets on one or more communication links with TOR 16A. Other examples of virtual network interfaces are described below.

A computing infrastructure for data center 10 implements an automation platform for automating deployment, scaling, and operations of virtual execution elements across racks 12 to provide virtualized infrastructure for executing application workloads and services. In some examples, the platform may be a container orchestration platform that provides a container-centric infrastructure for automating deployment, scaling, and operations of containers to provide a container-centric infrastructure. "Orchestration," in the context of a virtualized computing infrastructure generally refers to provisioning, scheduling, and managing virtual execution elements and/or applications and services executing on such virtual execution elements to the host servers available to the orchestration platform. Container orchestration, specifically, permits container coordination and refers to the deployment, management, scaling, and configuration, e.g., of containers to host servers by a container orchestration platform. Example instances of orchestration platforms include Kubernetes, Docker swarm, Mesos/Marathon, OpenShift, OpenStack, VMware, and Amazon ECS.

Elements of the automation platform of the computing infrastructure for data center 10 include network controller 22. Virtual execution elements may be deployed to a virtualization environment using a cluster-based framework in which a cluster master node of a cluster manages the deployment and operation of containers to one or more cluster minion nodes of the cluster.

As shown in FIG. 1, network controller 22 may execute on separate computing devices (control hosts 17) that are located in different racks 12. Network controller 22 may be a distributed application that executes on one or more computing devices. Network controller 22 may implement respective master nodes for one or more clusters each having one or more minion nodes implemented by respective racks 12. In general, network controller 22 may control the network configuration of the data center 10 fabric to, e.g., establish one or more virtual networks for packetized communications among virtual network endpoints. Network controller 22 may represent a distributed software-defined networking (SDN) controller for facilitating operation of one or more virtual networks within data center 10. In some examples, network controller 22 may operate in response to configuration input received from administrator 24. Additional information regarding network controller 22 operating in conjunction with other devices of data center 10 or other software-defined network is found in International Application Number PCT/US2013/044378, filed Jun. 5, 2013, and entitled "PHYSICAL PATH DETERMINATION FOR VIRTUAL NETWORK PACKET FLOWS;" and in U.S. patent application Ser. No. 14/226,509, filed Mar. 26, 2014, and entitled "Tunneled Packet Aggregation for Virtual Networks," each which is incorporated by reference as if fully set forth herein. U.S. patent application Ser. No. 14/226,509 also includes further description of a virtual router.

An orchestrator may control the deployment, scaling, and operations of virtual execution elements across clusters of racks 12 and providing computing infrastructure, which may include container-centric computing infrastructure. The orchestrator may implement respective cluster masters for one or more Kubernetes clusters. As an example, Kubernetes is a container management platform that provides portability across public and private clouds, each of which may provide virtualization infrastructure to the container management platform. Aspects of the orchestrator may be integrated into network controller 22.

Compute node 32A and/or storage node 34A may have deployed thereon Kubernetes pods, which are examples of a virtual network endpoint. A pod is a group of one or more logically-related containers (not shown in FIG. 1), the shared storage for the containers, and options on how to run the containers. Where instantiated for execution, a pod may, alternatively be referred to as a "pod replica." Each container of a pod may be an example of a virtual execution element. Containers of a pod are always co-located on a single server, co-scheduled, and run in a shared context. The shared context of a pod may be a set of Linux namespaces, cgroups, and other facets of isolation, Within the context of a pod, individual applications might have further sub-isolations applied. Containers within a pod have a common IP address and port space and may be able to detect one another via the localhost. Because they have a shared context, containers within a pod may communicate with one another using inter-process communications (IPC). Examples of IPC include SystemV semaphores or POSIX shared memory. Containers that are members of different pods may have different IP addresses and may be unable to communicate by IPC in the absence of a configuration for enabling this feature. Containers that are members of different pods may communicate with each other via pod IP addresses.

Management switches 21A-21X may be configured to route traffic between control hosts 17. For example, management switch 21A may be configured to route traffic using a controller virtual network extending between rack 12A and rack 12X. Compute nodes 32A-32X may be configured to provide computing services. Storage nodes 34A-34X may be configured to provide storage services.

In accordance with the techniques of the disclosure, network controller 22 may configure TOR switch 16A to enable communications, via a controller virtual network, between control host 17A and compute node 32A or storage node 34A connected to TOR switch 16A. For instance, network controller 22 may configure, using a management port of TOR switch 16A, TOR switch 16A to route traffic using an IRB interface. After configuring TOR switch 16A, network controller 22 may configure compute node 32A and/or storage node 34A by communicating with such nodes via TOR switch 16A. In this way, network controller 22 may configure TOR switch 16A, which is used to support network controller 22 itself, to allow network controller 22 to further customize the virtual network to support network controller 22.

Figure 2:
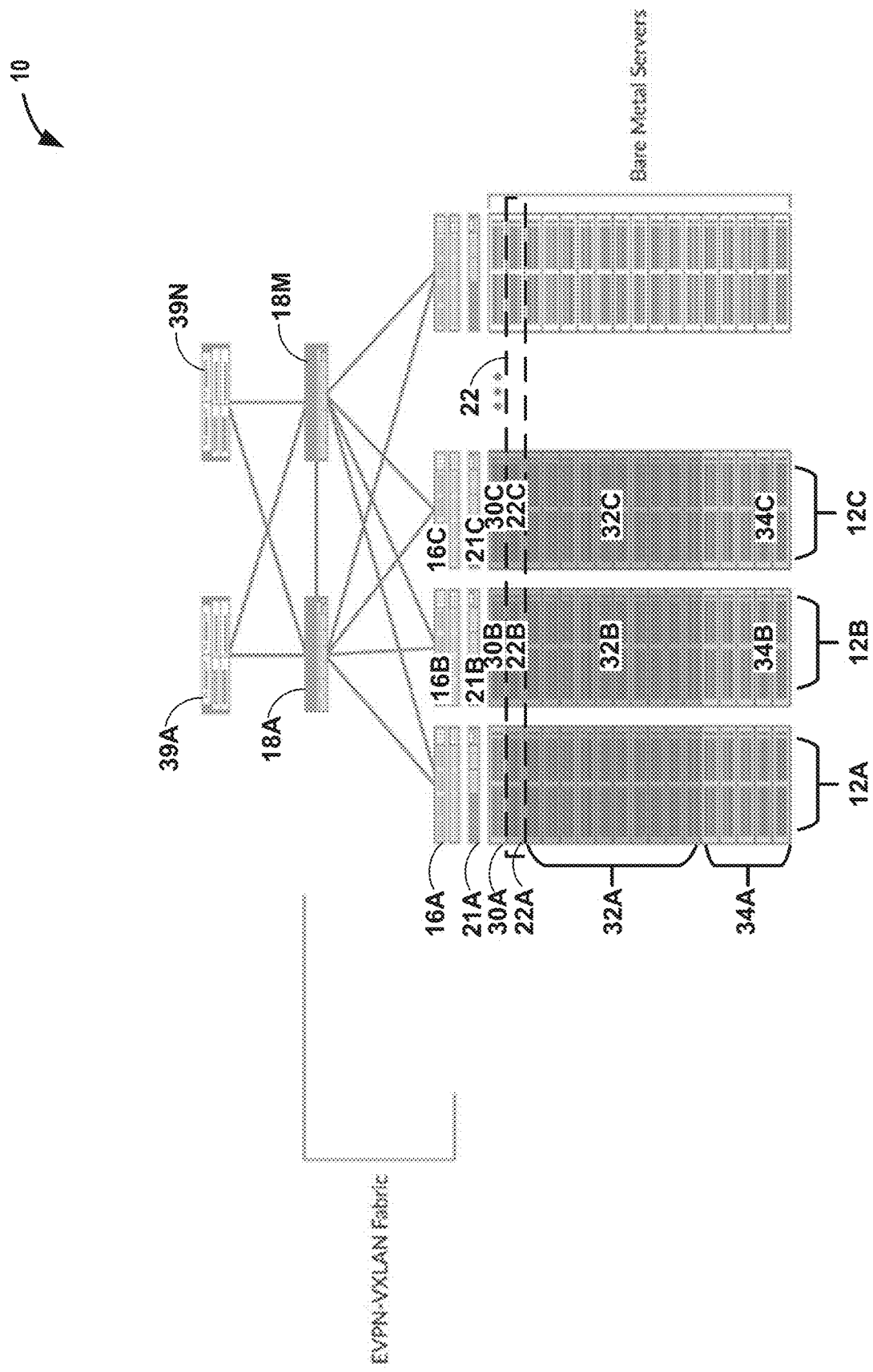
FIG. 2 is a block diagram illustrating an example data center, in accordance with the techniques of the disclosure.

The described techniques may provide one or more technical improvements that realize at least one practical application. For example, customizing the virtual network to support network controller 22 may improve a performance of network controller 22 itself and/or improve a performance of the virtual network managed by network controller 22. As another example, rather than relying on an existing network controller to configure TOR switch 16A to support network controller 22, techniques described herein permit a network controller 22 to configure its own TOR switch 16A to support network controller 22 and, therefore, FIG. 2 is a block diagram illustrating an example data center 10, in accordance with the techniques of the disclosure. In the example of FIG. 2, data center 10 includes 3 racks (e.g., racks 12A, 12B, and 12C), which collectively form racks 12. As shown, rack 12A may include a TOR switch 16A, which may represent a leaf switch, management switch 21A, jump host 30A, control host 17A, one or more compute nodes 32A, and one or more storage nodes 34A. Rack 12B may include a TOR switch 16B, which may represent a leaf switch, management switch 21B, jump host 30B, control host 17B, one or more compute nodes 32B, and one or more storage nodes 34B. Similarly, rack 12C may include a TOR switch 16C (which may represent a leaf switch), management switch 21C, jump host 30C, control host 17C, one or more compute nodes 32C, and one or more storage nodes 34C. Gateway routers 39A-39M (collectively, "gateway routers 39") may be configured to communicate with chassis switches 18. In some examples, gateway routers 39 may each comprise an SDN gateway router. While the example of FIGS. 3-13 illustrate a jump host, in some examples other provisioning hosts may be used, for example a metal-as-a-service (MAAS) with Juju.

In accordance with the techniques of the disclosure, with control host 17A installed in rack 12A having management switch 21A and control host 17B installed in rack 12B, control hosts 17A-22C may execute controller nodes that implement network controller 22 (e.g., an SDN controller) using a controller virtual network extending between rack 12A and rack 12B via management switch 21A and management switch 21B. The controller nodes are software instances of a network controller that cooperatively implement network controller 22.

Management switch 21A may be configured to route traffic between the controller virtual network and a device management network extending from management switch 21A to TOR switch 16A of the fabric managed by the SDN controller. Network controller 22 may configure, via management switch 21A, TOR switch 16A with the controller virtual network to enable communications, via the controller virtual network, between control host 17A and compute node 32A and/or storage node 34A connected to TOR switch 16A. In this way, network controller 22 (e.g., the SDN controller) may configure TOR switch 16A to support network controller 22 itself, which may allow network controller 22 to further customize the virtual network to support network controller 22. Customizing the virtual network to support network controller 22, may enable the controller nodes implemented by control hosts 17A-17X to communicate so that they can the configure TOR switches 16A-16X.

Figure 3:
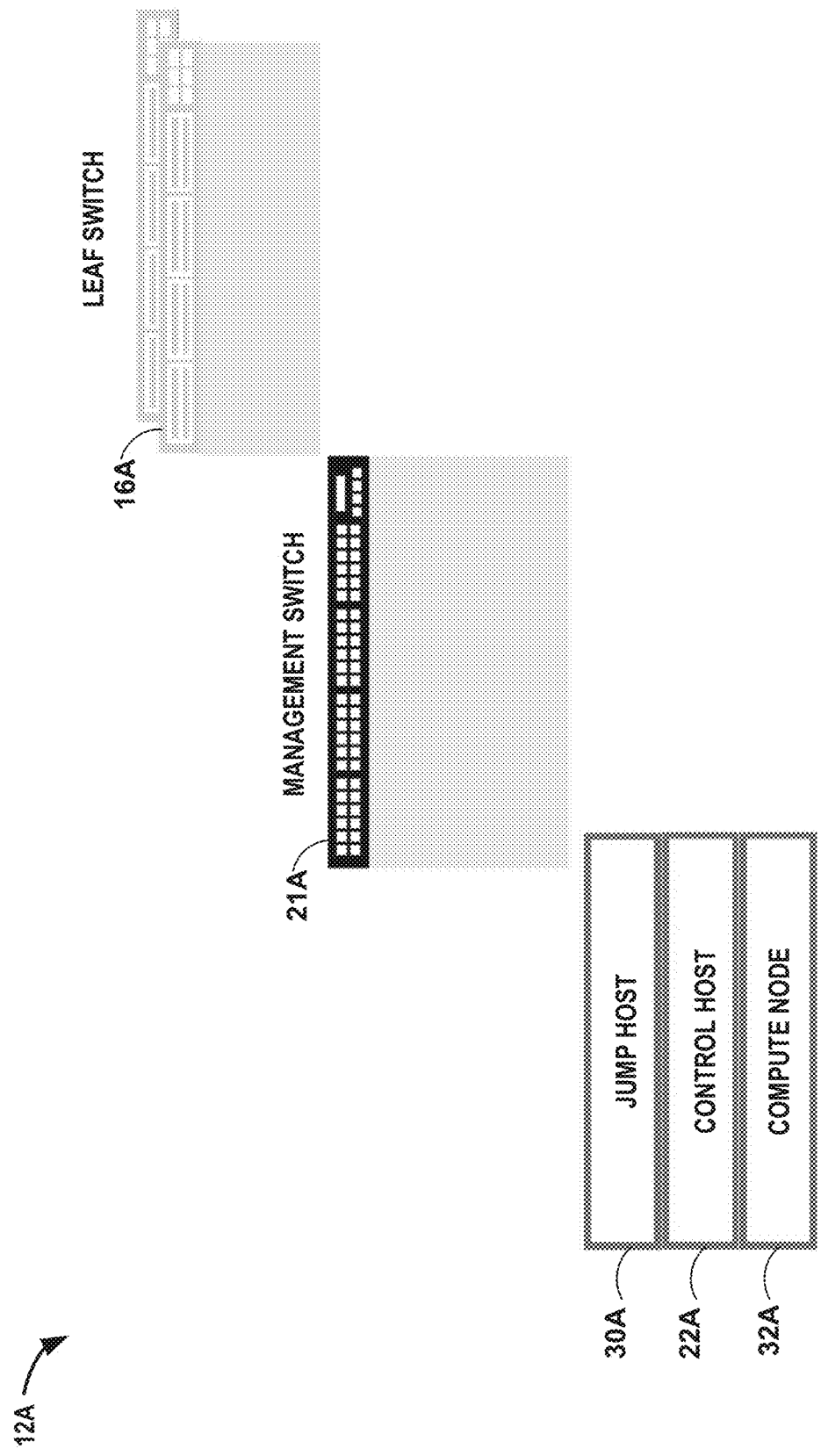
FIG. 3 is a block diagram illustrating a rack of a data center, in accordance with the techniques of the disclosure.

FIG. 3 is a block diagram illustrating a rack 12A of data center 10, in accordance with the techniques of the disclosure. The example processes described in FIGS. 3-13 may permit an installation of an orchestrator and network controller using various deployers, such as, for example, Contrail Cloud, Red Hat OpenStack Platform director (RHOSPd), or MaaS/Juju, into a fabric where network controller 22 will be used to configure ports of leaf switches according to the roles of servers (e.g., a network controller, a compute node, a storage node) attached to them. That is, a network controller implemented in part by controller host 17A may be deployed into a fabric implemented by TOR switch 16A, which is illustrated as a "leaf switch," where the SDN controller is used to configure ports of TOR switch 16A.

The processes described in FIGS. 3-13 may not use ports for connecting controller host 17A to other controller hosts (e.g., controller host 17B and/or controller host 17C) of network controller 22 that are configured before the controller nodes used to implement network controller 22 are installed. For example, rather than relying on pre-configured ports, the process of FIGS. 3-13 may configure connectivity in a device management network implemented using management switch 21A and extend the device management network to ports on TOR switch 16A (e.g., leaf switches) after network controller 22 has been deployed. The ports of TOR switch 16A for compute node 32A and one or more storage nodes can be configured, via the management switch 214A, TOR switch 16A with the controller virtual network to enable communications, via the controller virtual network, between control host 17A and compute node 32A or a storage node (not shown) connected to TOR switch 16A (e.g., the fabric network device), and servers onboarded into the cluster.

In the example of FIG. 3, rack 12A of data center 10 may include TOR switch 16A, management switch 21A, jump host 30A, controller host 17A, and compute node 32A. One or more other racks of data center 10 may include similar devices. In the physical implementation, TOR switch 16A, management switch 21A, jump host 30A, controller host 171, and compute node 32A may be located in the same rack and the controller hosts may be installed in three different racks, with controller VLANs extended between the racks. For clarity, only components of the first rack (e.g., rack 12A) are shown. While the examples of FIG. 3-13 illustrate a TOR leaf switch as a fabric network device, other fabric network devices may be used. For example, a chassis switch or a gateway router may be used additionally or alternatively to a TOR.

Figure 4:
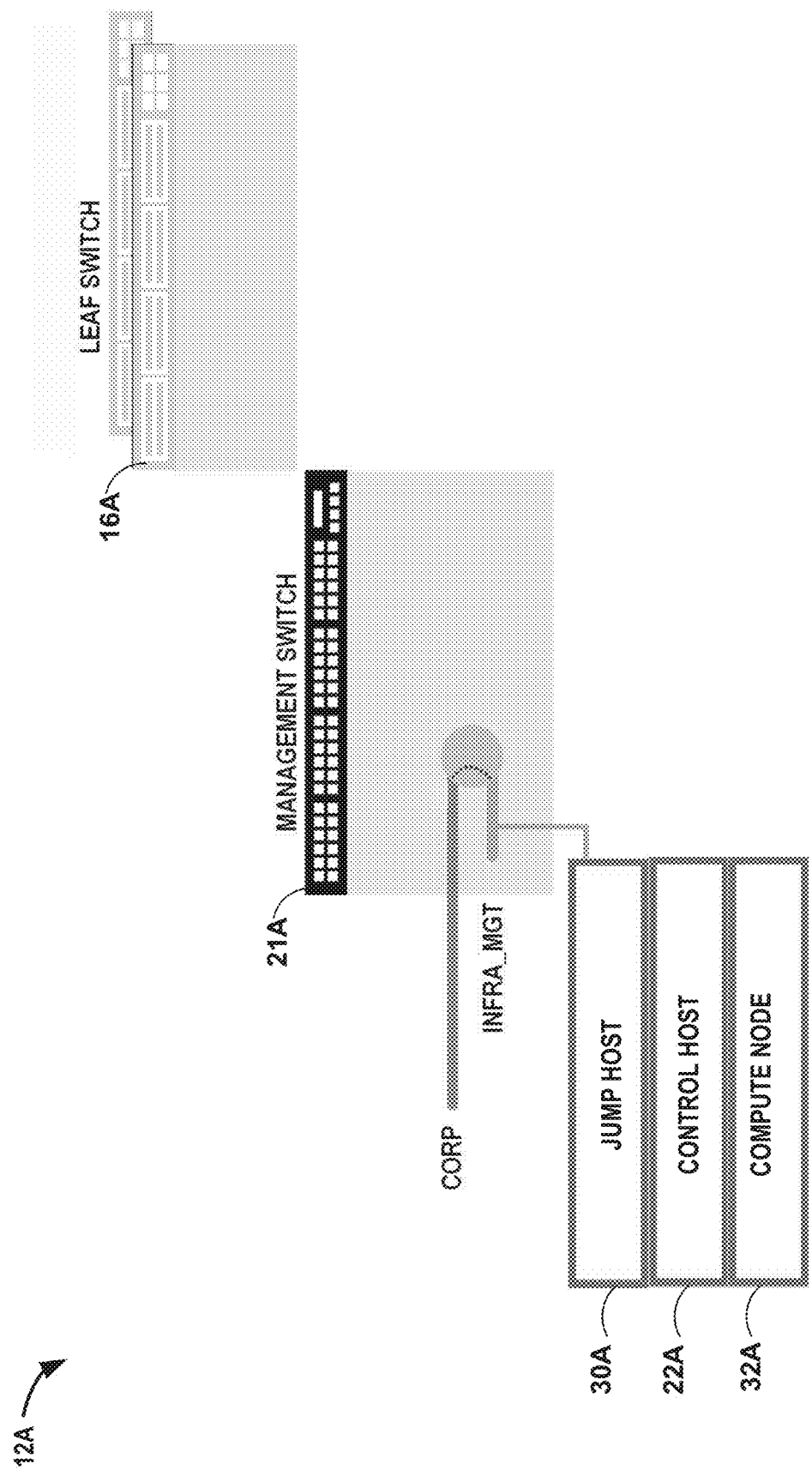
FIG. 4 is a block diagram illustrating a configuration of a management switch of the rack of FIG. 3, in accordance with the techniques of the disclosure.

FIG. 4 is a block diagram illustrating a configuration of management switch 21A of rack 12A of FIG. 3, in accordance with the techniques of the disclosure. In the example of FIG. 4, management switch 21A is configured to provide networking for jump host 30A. For example, a script and/or administrator may configure the infrastructure management network (INFRA_MGT) network to provide networking for jump host 30A.

Figure 5:
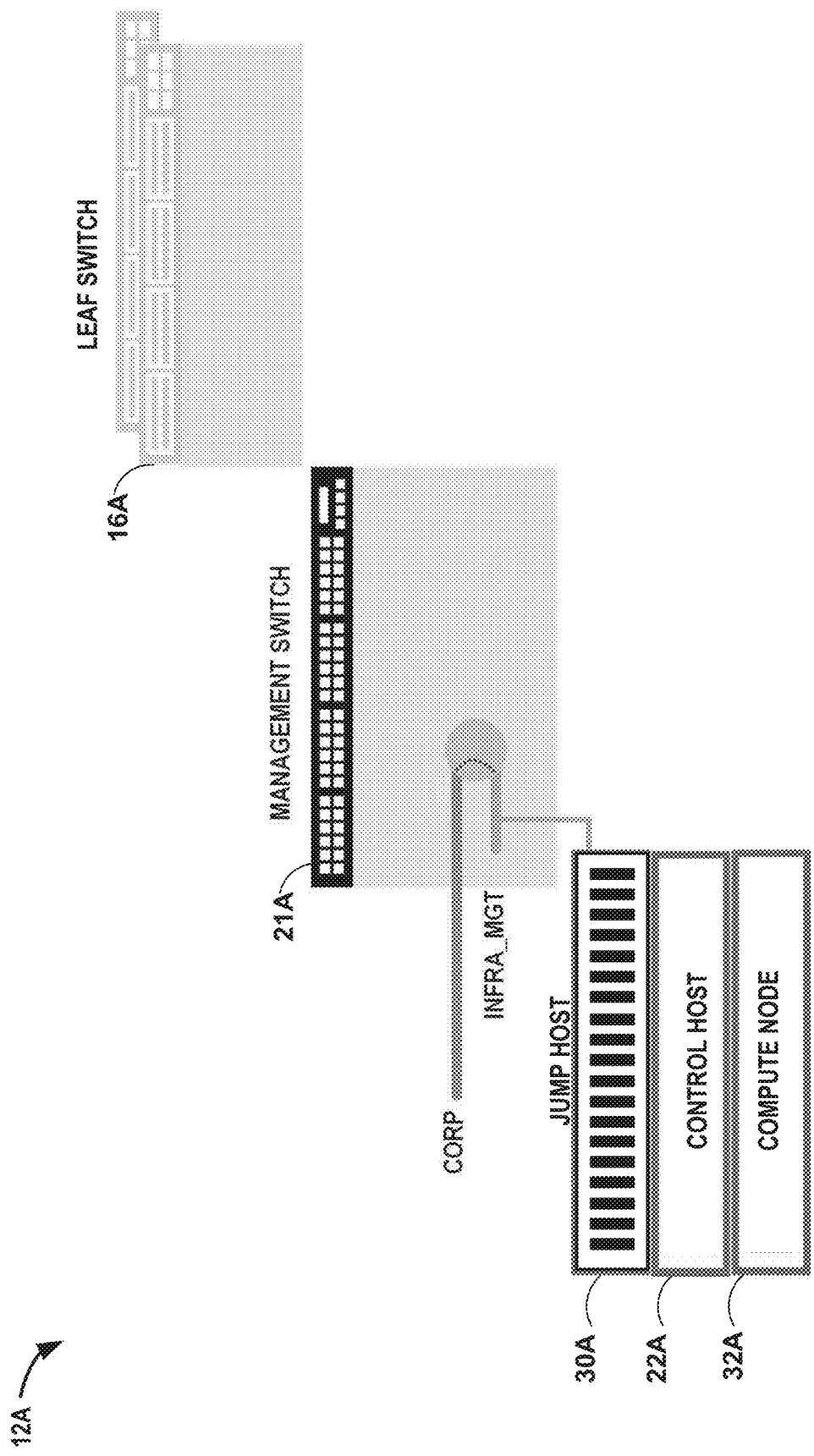
FIG. 5 is a block diagram illustrating an initialization of a jump host of the rack of FIG. 3, in accordance with the techniques of the disclosure.

FIG. 5 is a block diagram illustrating an initialization of jump host 30A of rack 12A of FIG. 3, in accordance with the techniques of the disclosure. In the example of FIG. 5, jump host 30A is installed. For example, a script or administrator installs jump host 30A using the infrastructure management network (INFRA_MGT) network.

Figure 6:
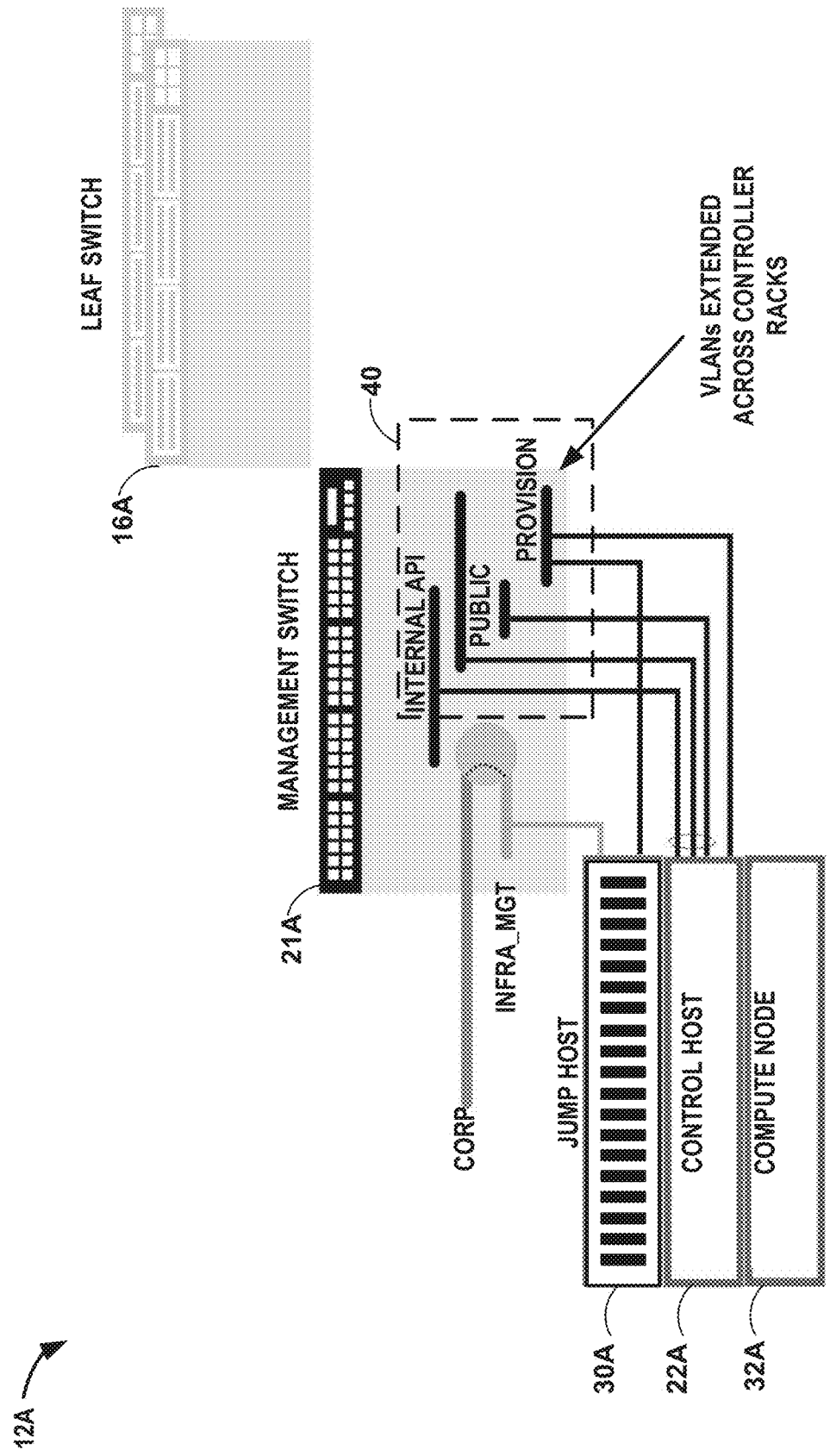
FIG. 6 is a block diagram illustrating a configuration of a controller virtual network for the rack of FIG. 3, in accordance with the techniques of the disclosure.

FIG. 6 is a block diagram illustrating a configuration of one or more controller virtual networks 40 for rack 12A of FIG. 3, in accordance with the techniques of the disclosure. Specifically, a script and/or administrator may configure ports on management switch 21A to support the networks used for jump host 30A and controller host 17A. For instance, the script or administrator may configure management switch 21A to support RHOSP and/or MaaS/Juju (Canonical).

In the example of FIG. 6, management switch 21A is configured to provide networking for controller host 17A. For example, a script or administrator configures management switch 21A to route traffic between a controller virtual network (e.g., illustrated as including an internal API network, a public network, and a provision network).

Controller virtual networks 40 may comprise one or more first virtual networks that are each assigned to a first subnet associated with the first rack (e.g., rack 12A). In some examples, controller virtual networks 40 may comprise one or more second virtual networks that are each assigned to a second subnet associated with a second rack (e.g., rack 12B). In some examples, the one or more first virtual networks may comprise an internal application programming interface (API) network, a public network, or a provision network. Similarly, the one or more second virtual networks may comprise an internal API network, a public network, or a provision network.

Figure 7:
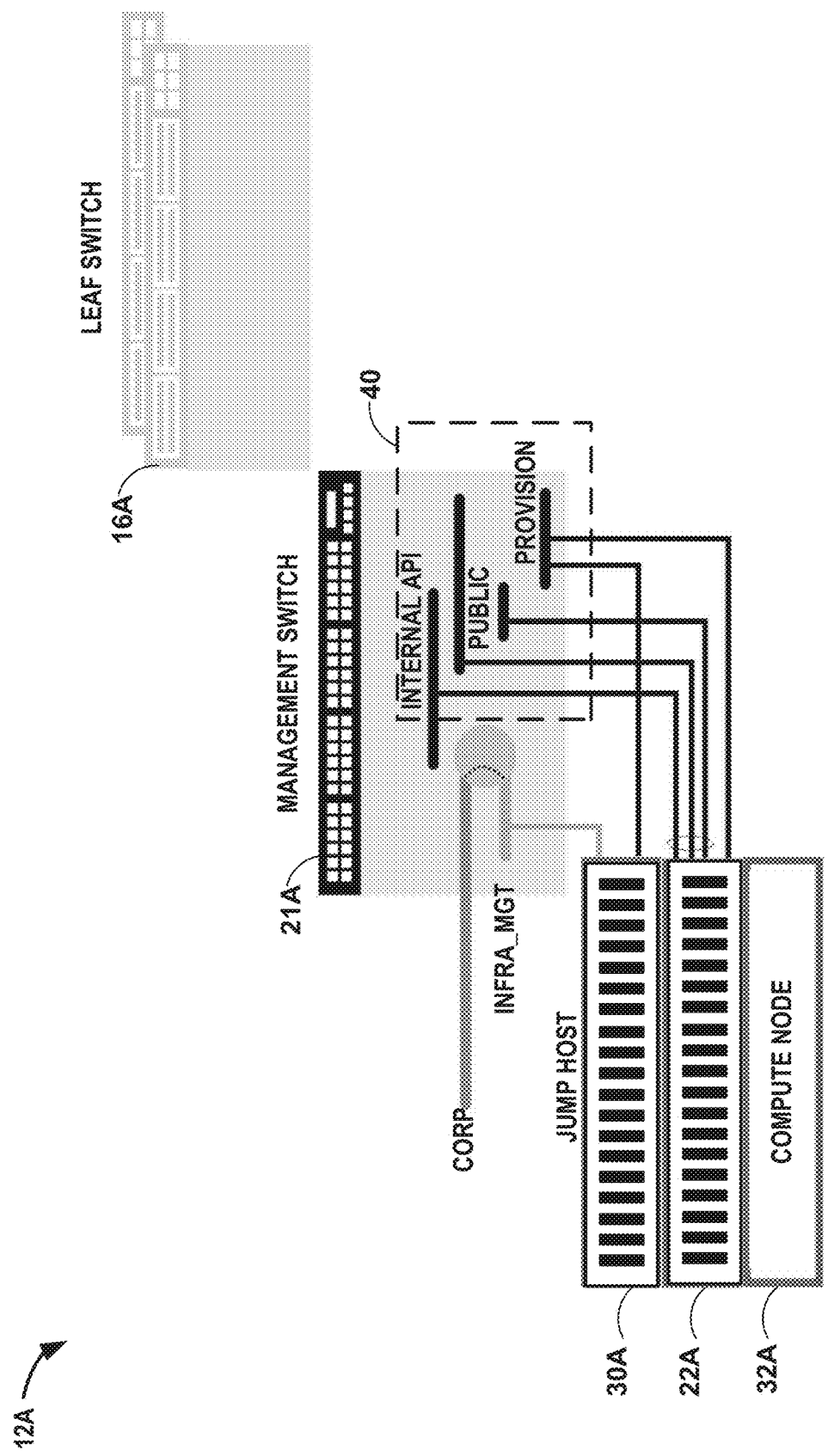
FIG. 7 is a block diagram illustrating an execution of controller nodes that implement an SDN controller using the controller virtual network of FIG. 6, in accordance with the techniques of the disclosure.

FIG. 7 is a block diagram illustrating an execution of controller nodes that implement an SDN controller using controller virtual networks 40 of FIG. 6 in accordance with the techniques of the disclosure. In the example of FIG. 7, controller host 17A is installed. For example, a script or administrator installs controller host 17A using controller virtual networks 40 (e.g., a provision network) and the infrastructure management network (INTRA_MGT) network. The various controller virtual networks 40 are used by controller nodes executing on control hosts 17 to communicate with one another to deploy new nodes and install software packages ("provision"); provide communication with the orchestrator and/or controller networking services using API communication, RPC messages, and/or database communication ("internal API"); support overlay data plane traffic and controller control plane traffic with compute nodes 32; and provide accessibility to tenants for certain interfaces, external APIs, and services ("public").

Figure 8:
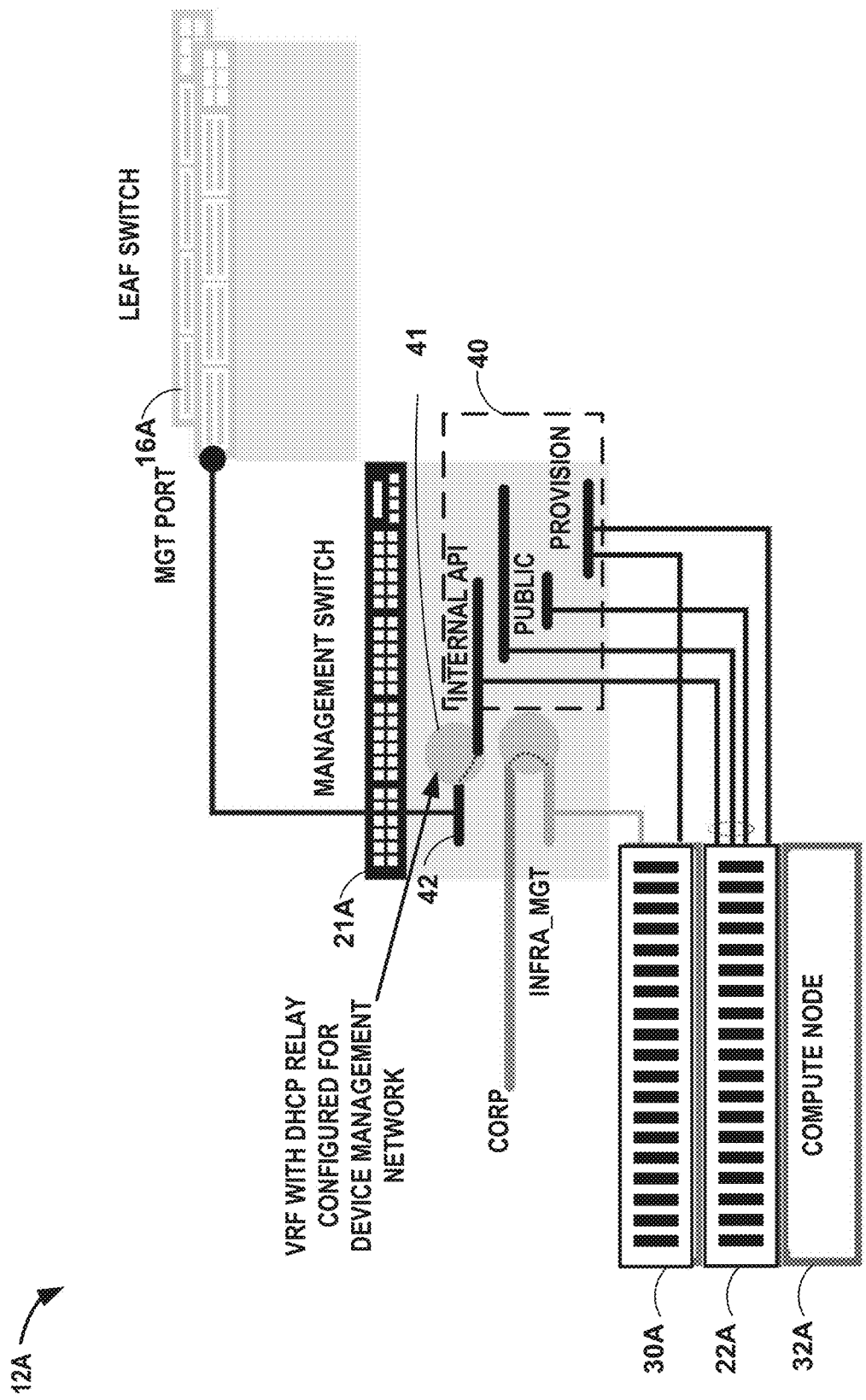
FIG. 8 is a block diagram illustrating a first step of configuring of a leaf switch via the controller virtual network of FIG. 6, in accordance with the techniques of the disclosure.

FIG. 8 is a block diagram illustrating a first step of configuring of a leaf switch via controller virtual networks 40 of FIG. 6, in accordance with the techniques of the disclosure. In the example of FIG. 8, an administrator may attach a management port of TOR switch 16A to management switch 21A. In some examples, the management port of TOR switch 16A has been previously attached to management switch 21A, for example, during an initial setup of rack 12A. A script and/or administrator may configure management switch 21A to route traffic between controller virtual networks 40 and the device management network 42. For example, the script and/or administrator may configure TOR switch 16A to route traffic using one or more integrated routing and bridging (IRB) interfaces. For example, the script and/or administrator may create IRBs in a VRF 41 that enables routing between management switch 21A and controller virtual networks 40. The script and/or administrator may configure a DHCP relay from the management IRB for device management network 42 to an IP address of controller host 17A on controller virtual networks 40. For example, the script and/or administrator may configure management switch 21A to perform VRF with VRF 41 to route traffic between controller virtual networks 40 and device management network 42.

The script and/or administrator may create IRBs in VRF 41 that enable routing between management switch 21A and controller virtual networks 40, and to configure DHCP relay from the management IRB to the controller IP addresses. For example, the script and/or administrator may configure management switch 21A to use a dynamic host configuration protocol (DHCP) relay to assign an Internet protocol (IP) address to the fabric network device. The fabric devices may be onboarded into the network controller 22 and configured into their underlay and overlay roles. Controller virtual networks 40 may comprises one or more virtual local area networks (VLANs) extended across at least rack 12A and another rack (e.g., rack 12B).

Figure 9:
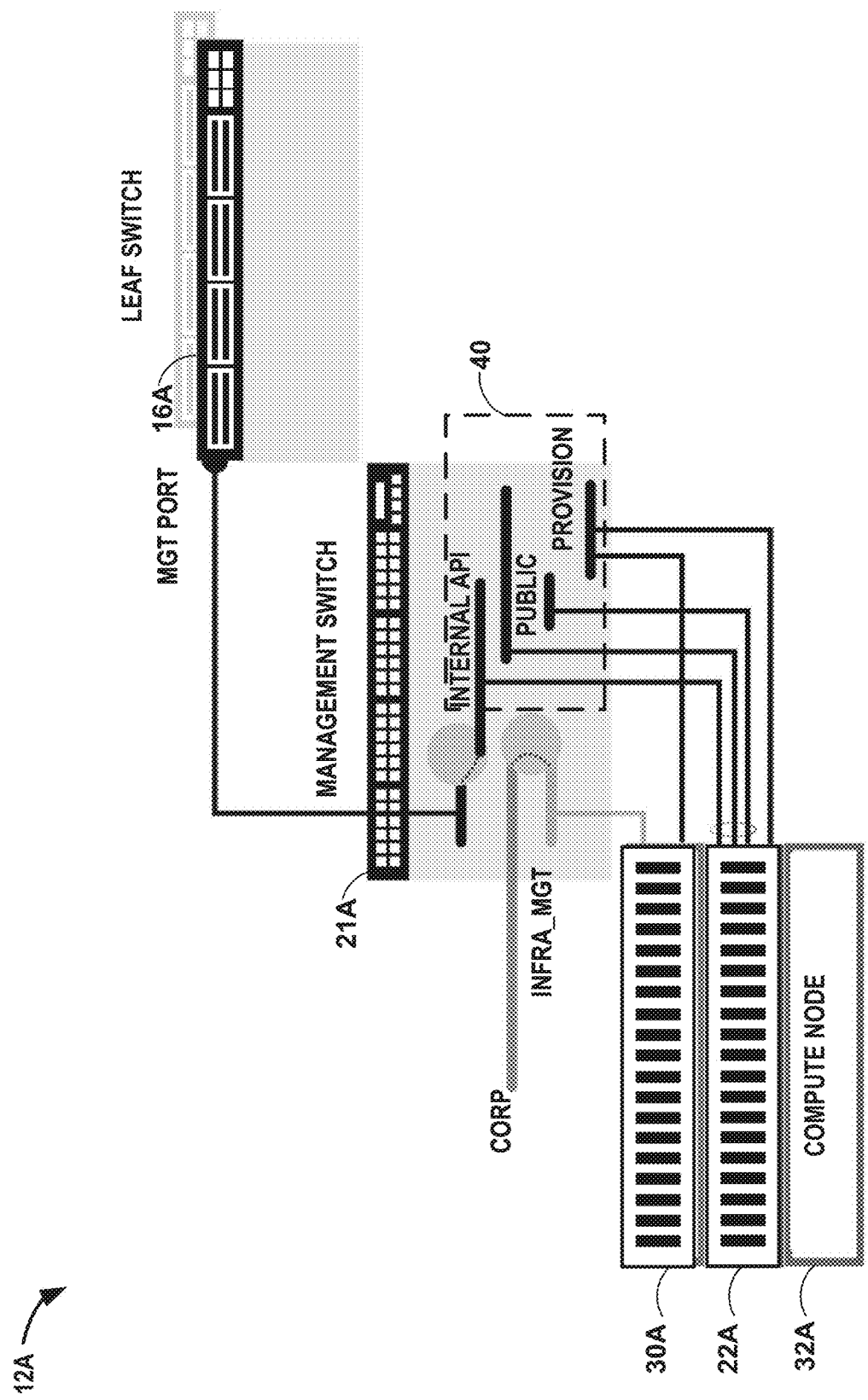
FIG. 9 is a block diagram illustrating a second step of configuring of a leaf switch via the controller virtual network of FIG. 6, in accordance with the techniques of the disclosure.

FIG. 9 is a block diagram illustrating a second step of configuring of a leaf switch via controller virtual networks 40 of FIG. 6, in accordance with the techniques of the disclosure. In the example of FIG. 9, TOR switch 16A may be onboarded into the network controller 22 and configured into their underlay and overlay roles.

For example, network controller 22 (e.g., using control node 22A), may receive via controller virtual networks 40, a broadcast request for an initial configuration for TOR switch 16A. Network controller 22 may output, via the controller virtual networks 40, a location for the initial configuration at the SDN controller to TOR switch 16A in response to the broadcast request. Network controller 22 may receive, via controller virtual networks 40, a request for the initial configuration from the fabric network device. Network controller 22 may output, via controller virtual networks 40, the initial configuration to the fabric network device in response to the request for the initial configuration.

Network controller 22 may onboard TOR switch 16A using a management port of management switch 21A. For example, network controller 22 may output, via the controller virtual networks 40 and the management port, a location for the initial configuration at network controller 22 to TOR switch 16A in response to the broadcast request. Network controller 22 may receive, via controller virtual networks 40 and the management port, a request for the initial configuration from the fabric network device. Network controller 22 may output, via controller virtual networks 40 and the management port, the initial configuration to the fabric network device in response to the request for the initial configuration.

Figure 10:
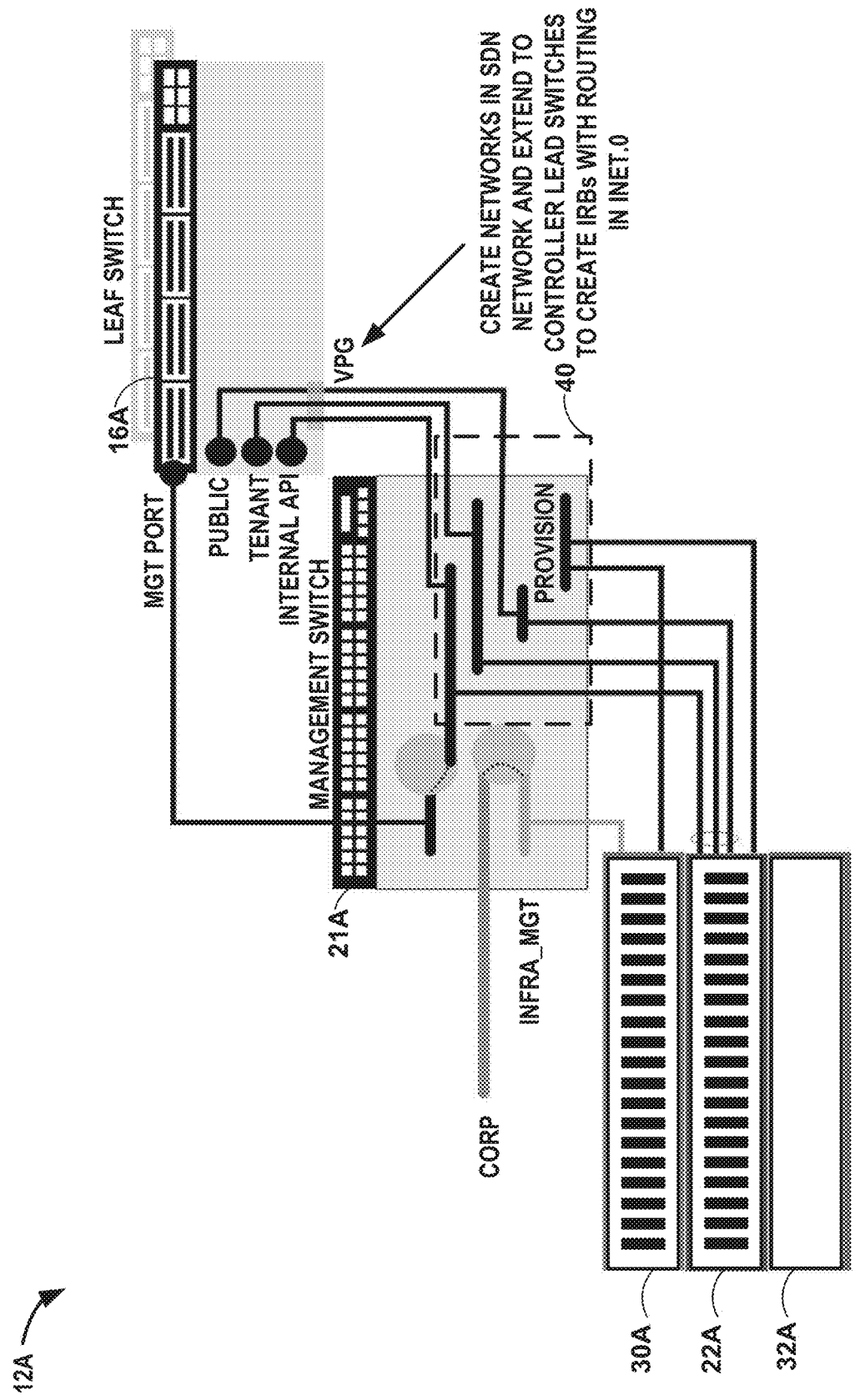
FIG. 10 is a block diagram illustrating a third step of configuring of a leaf switch via the controller virtual network of FIG. 6, in accordance with the techniques of the disclosure.

FIG. 10 is a block diagram illustrating a third step of configuring of TOR switch 16A via controller virtual networks 40 of FIG. 6 in accordance with the techniques of the disclosure. In the example of FIG. 10, the administrator and/or script may create virtual networks in the network controller 22 for the internal API, the public, and the provision networks with the same subnets, netmasks, and default gateways as were configured in management switch 21A.

Again, controller virtual networks 40 may comprise one or more first virtual networks that are each assigned to a first subnet associated with the first rack (e.g., rack 12A). In some examples, controller virtual networks 40 may comprise one or more second virtual networks that are each assigned to a second subnet associated with a second rack (e.g., rack 12B). The one or more first virtual networks may comprise an internal application programming interface (API) network, a public network, or a provision network. Similarly, the one or more second virtual networks may comprise an internal API network, a public network, or a provision network.

In some examples, the administrator and/or script may configure TOR switch 16A to enable communications for control host 17A using the one or more first virtual networks. The administrator and/or script may configure TOR switch 16A to enable communications for another control host (e.g., control host 17B) using the one or more second virtual networks.

The administrator and/or script may configure the port on management switch 21A with the controller VLANs. In some examples, the administrator and/or script may create a virtual port group (VPG) on each connected port of TOR switch 16A containing the controller VLANs. The administrator and/or script may extend the controller virtual network to TOR switch 16A. Extending a network to a network switch may cause an IRB for that virtual network to be created with the gateway address and which is routed in inet.0, which may be the main routing table.

Figure 11:
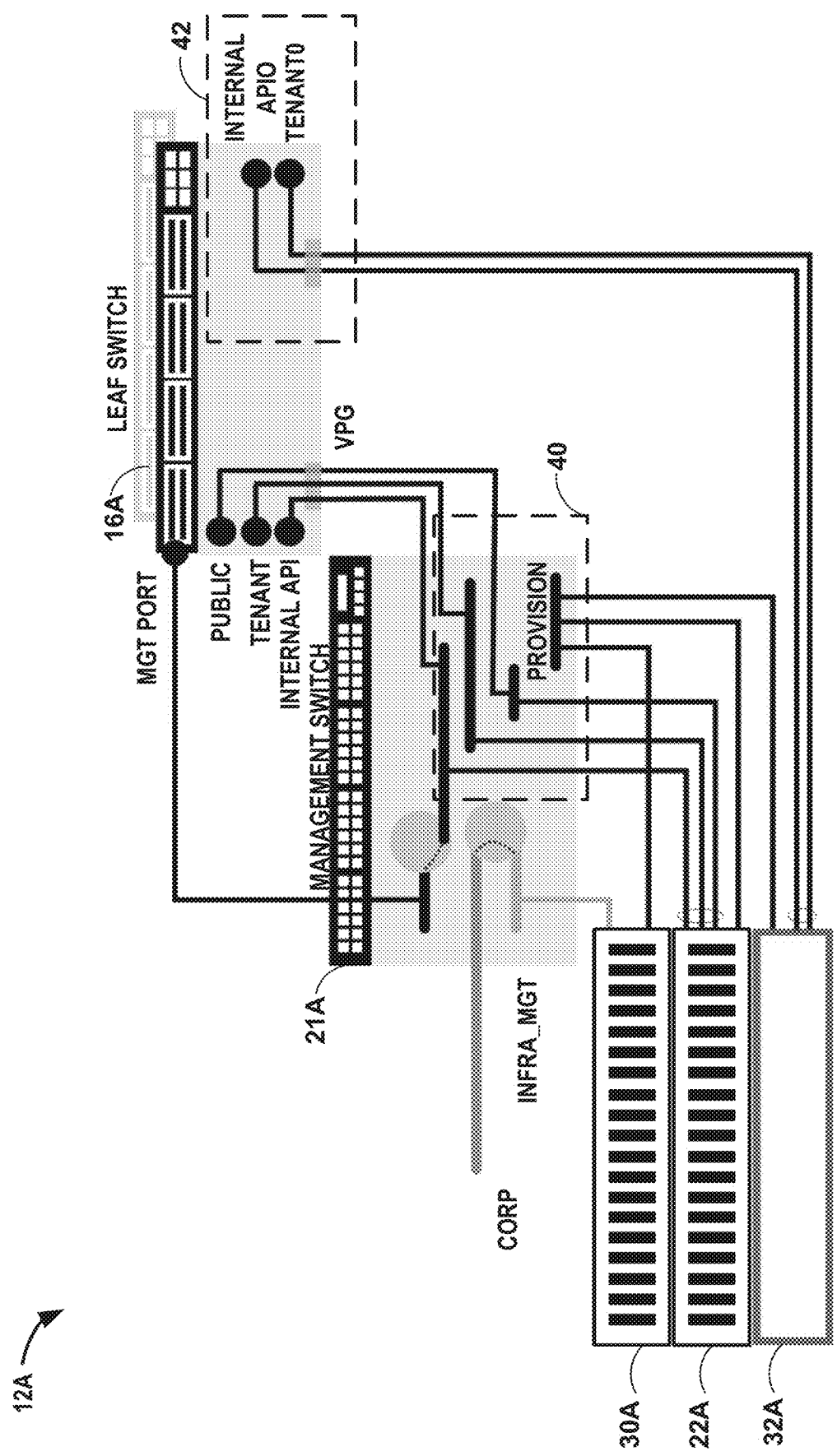
FIG. 11 is a block diagram illustrating a fourth step of configuring of a leaf switch via the controller virtual network of FIG. 6, in accordance with the techniques of the disclosure.

FIG. 11 is a block diagram illustrating a fourth step of configuring of a leaf switch via controller virtual networks 40 of FIG. 6, in accordance with the techniques of the disclosure. In the example of FIG. 11, an administrator connects controller host 17A, via management switch 21A, to ports of TOR switch 16A. Again, the administrator may make similar connections in other racks. In some examples, controller host 17A may have previously been connected, via management switch 21A, to ports of TOR switch 16A, for example, during an initial setup of rack 12A.

Figure 12:
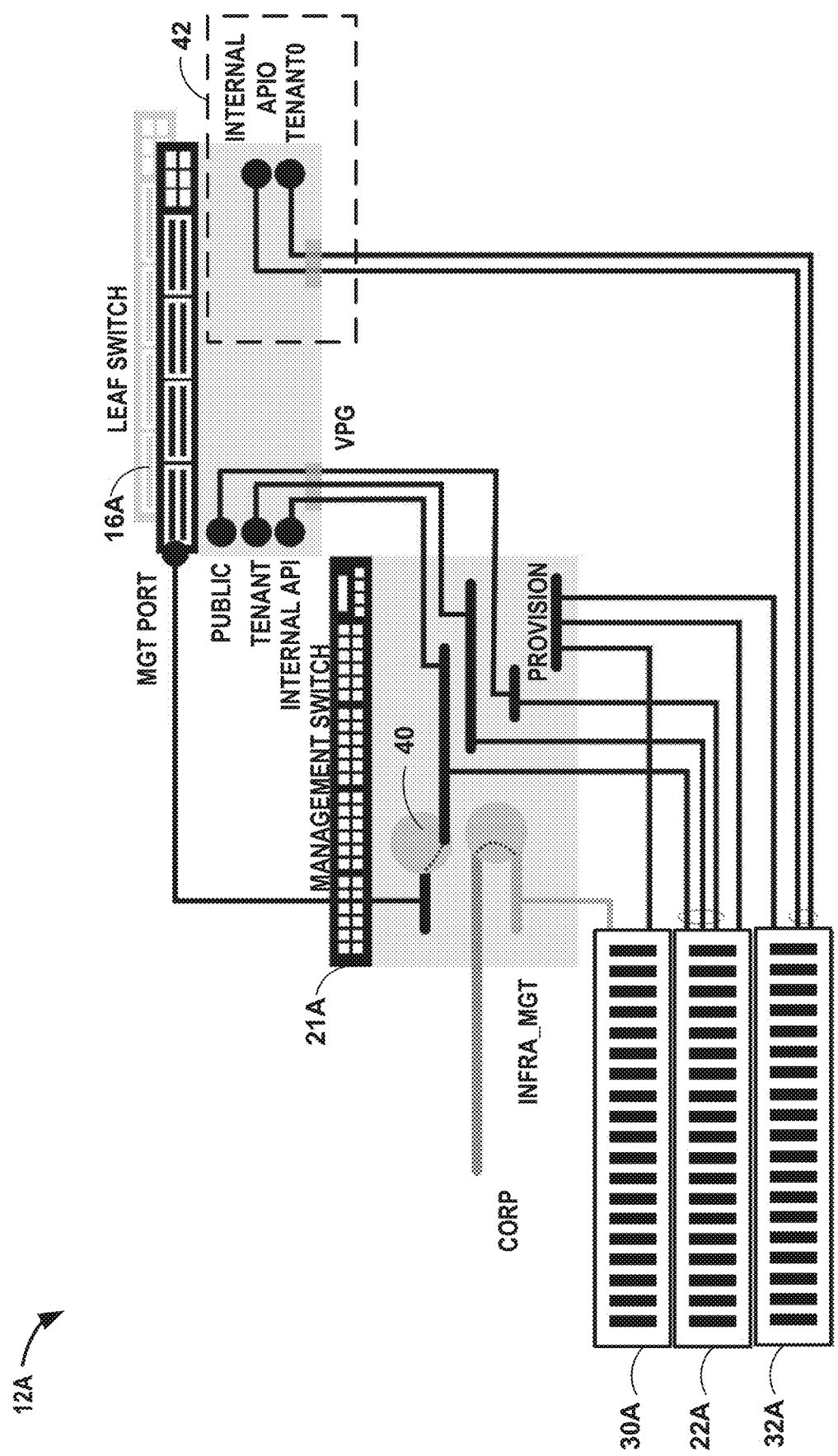
FIG. 12 is a block diagram illustrating a first initialization of a compute node of the rack of FIG. 3, in accordance with the techniques of the disclosure.

FIG. 12 is a block diagram illustrating a first initialization of a compute node 32A of rack 12A of FIG. 3, in accordance with the techniques of the disclosure. In the example of FIG. 12, the SDN controller implemented with controller node 22A may deploy compute node 32A. In some examples, network controller 22 implemented with controller node 22A may deploy Bare Metal Server (BMS) nodes of a cluster, such as an OpenStack cluster. Network controller 22 may deploy one or more storage nodes. For example, network controller 22 may, with jump host 30A, provision compute node 32A using controller networks 40.

In an architecture for controller networking, separate subnets for each controller network may be used in each rack. In RHOSPd, the rack-specific network names may have a suffix that is the same as the rack number (e.g., Tenant1). The rack-specific subnets may be created in network controller 22 and extended to the corresponding leaf switches.

Once the servers/racks have been racked and stacked, the cable plan can be used to identify the port within a role (e.g., a compute node, a storage node, or a BMS node) that each leaf switch port may be configured for, and VPGs can be created for pairs of leaf ports that server bond interfaces are connected to. For clarity, only one of the pair of connections for a bond interface is shown in FIG. 12. Routing between nodes located in different racks (e.g., racks 12B, 12C) may be enabled after each leaf switch advertises a route to local subnets to the other switches via the fabric route reflectors.

Figure 13:
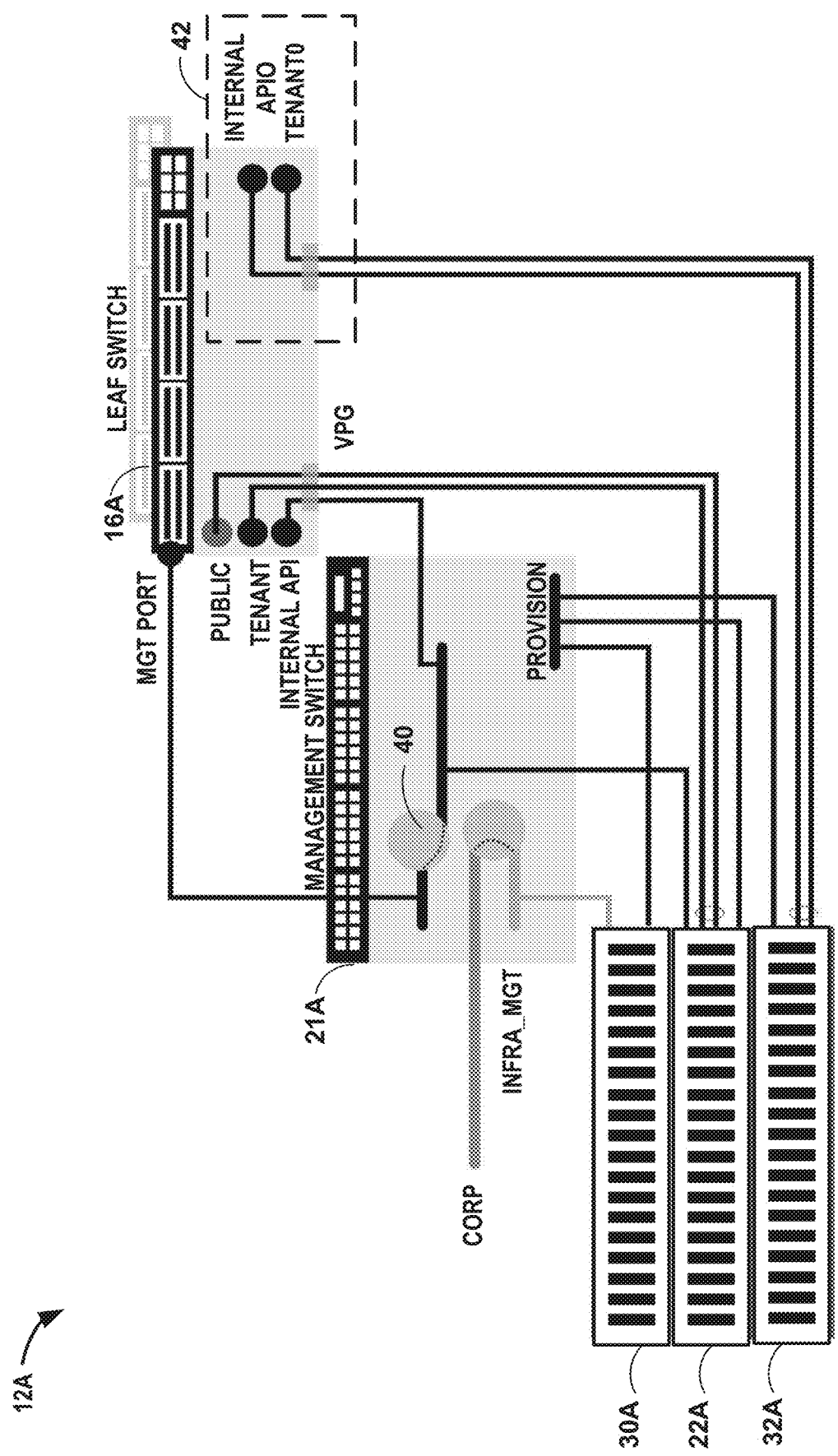
FIG. 13 is a block diagram illustrating a second initialization of a compute node of the rack of FIG. 3, in accordance with the techniques of the disclosure.

FIG. 13 is a block diagram illustrating a second initialization of compute node 32A of rack 12A of FIG. 3, in accordance with the techniques of the disclosure. In the example of FIG. 13, an administrator may provide cables to connect control host 17A to TOR switch 16A.

Figure 14:
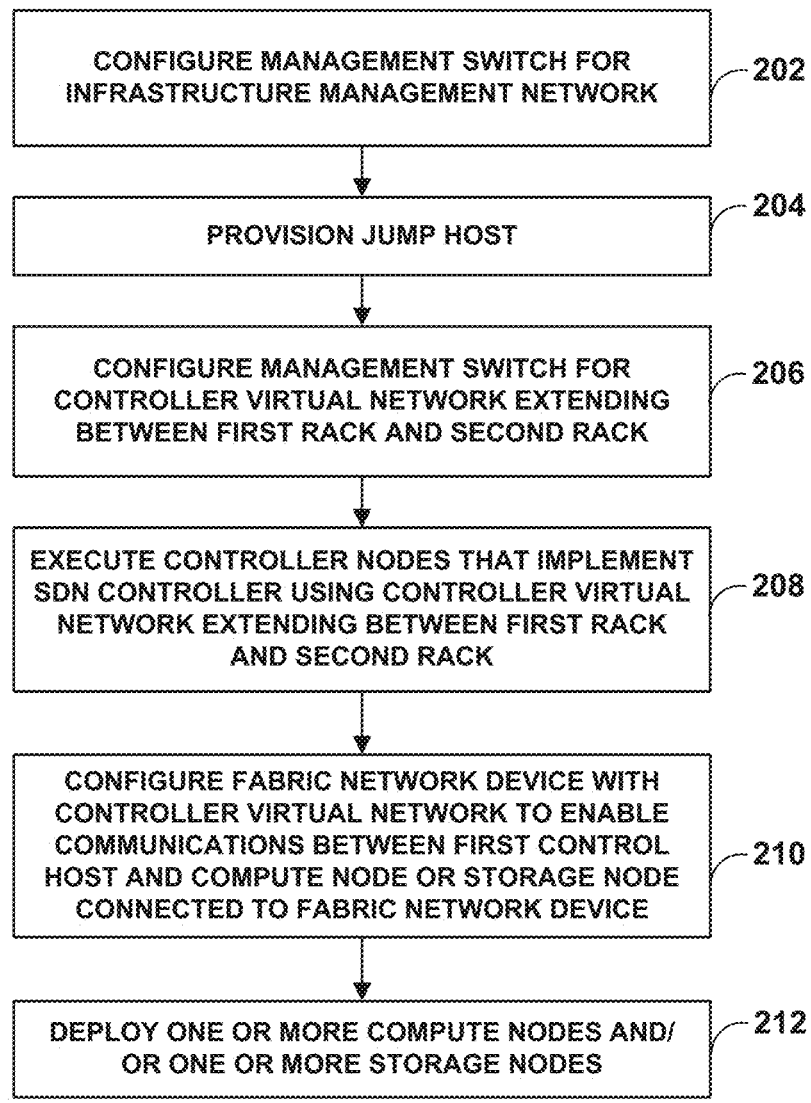
FIG. 14 is a flowchart illustrating a process for configuring a fabric managed by a software-defined networking (SDN) controller, in accordance with the techniques of the disclosure.

FIG. 14 is a flowchart illustrating a process for configuring a fabric managed by a SDN controller in accordance with the techniques of the disclosure. A script executing at a processor and/or an administrator may configure management switch 21A for an infrastructure management network (202). The script executing at a processor and/or an administrator may provision jump host 30A (204). The script executing at a processor and/or administrator may configure management switch 21A for a controller virtual network extending between a first rack and a second rack (206). For instance, the script executing at the processor and/or administrator may configure management switch 21A to route traffic between controller virtual networks 40 and device management network 42.

The script executing at a processor and/or administrator may execute controller nodes that implement an SDN controller using a controller virtual network extending between the first rack and the second rack (208). The script executing at a processor and/or administrator may configure a fabric network device with the controller virtual network to enable communications, via the controller virtual network, between the first control host and a compute node or a storage node connected to the fabric network device (210). For example, the script executing at the processor and/or administrator may configure, with the SDN controller, via first management switch 21A, TOR switch 16A with controller virtual networks 40 to enable communications, via controller virtual networks 40, between first control host 17A and compute node 32A or storage node 34A. The script executing at a processor and/or administrator may deploy the compute node and/or storage node (212). For example, the script executing at the processor and/or administrator may deploy, with jump host 30A, compute node 32A and/or storage node 34A.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A method for configuring a fabric managed by a software-defined networking (SDN) controller, the method comprising:
    with a first control host installed in a first rack having a first management switch and a second control host installed in a second rack, executing controller nodes that implement an SDN controller using a controller virtual network extending between the first rack and the second rack,
    wherein the first management switch is configured to route traffic between the controller virtual network and a device management network extending from the first management switch to a fabric network device of the fabric managed by the SDN controller; and
    configuring, with the SDN controller, via the first management switch, the fabric network device with the controller virtual network to enable communications, via the controller virtual network, between the first control host and a compute node or a storage node connected to the fabric network device.

2. The method of claim 1,
    wherein the controller virtual network comprises one or more first virtual networks that are each assigned to a first subnet associated with the first rack and one or more second virtual networks that are each assigned to a second subnet associated with the second rack; and
    wherein configuring the fabric network device comprises configuring the fabric network device to enable communications for the first control host using the one or more first virtual networks and configuring the fabric network device to enable communications for the second control host using the one or more second virtual networks.

3. The method of claim 2, wherein the one or more first virtual networks comprises an internal application programming interface (API) network, a public network, or a provision network.

4. The method of claim 1, wherein configuring the fabric network device comprises:
    receiving, with the SDN controller and via the controller virtual network, a broadcast request for an initial configuration for the fabric network device;
    outputting, with the SDN controller and via the controller virtual network, a location for the initial configuration at the SDN controller to the fabric network device in response to the broadcast request;
    receiving, with the SDN controller and via the controller virtual network, a request for the initial configuration from the fabric network device; and outputting, with the SDN controller and via the controller virtual network, the initial configuration to the fabric network device in response to the request for the initial configuration.

5. The method of claim 1, wherein configuring the fabric network device comprises configuring the fabric network device using a management port of the fabric network device.

6. The method of claim 1, wherein, to route traffic, the first management switch is configured to perform virtual routing and forwarding (VRF) to route traffic between the controller virtual network and the device management network.

7. The method of claim 6, further comprising wherein, to route traffic, the first management switch is configured to use a dynamic host configuration protocol (DHCP) relay to assign an Internet protocol (IP) address to the fabric network device.

8. The method of claim 1, wherein the controller virtual network comprises a virtual local area network (VLAN) extended across at least the first rack and the second rack.

9. The method of claim 1, wherein the fabric network device comprises one or more of a leaf switch, a chassis switch, or a gateway.

10. The method of claim 9, wherein configuring the fabric network device comprises configuring the fabric network device to route traffic using an integrated routing and bridging (IRB) interface.

11. The method of claim 1, wherein one or more of the compute node or the storage node are provisioned using a provisioning host using the controller virtual network.

12. The method of claim 11, wherein the provisioning host comprises one or more of a jump host or metal-as-a-service (MAAS) with Juju.

13. The method of claim 1, further comprising configuring the first management switch to route traffic between the controller virtual network and the device management network.

14. A system for configuring a fabric managed by a software-defined networking (SDN) controller, the system comprising:
 a first control host installed in a first rack;
 a second control host installed in a second rack, wherein the first control host and the second control host are configured to execute controller nodes that implement an SDN controller using a controller virtual network extending between the first rack and the second rack;
 a first management switch installed in the first rack, wherein the first management switch is configured to route traffic between the controller virtual network and a device management network extending from the first management switch to a fabric network device of the fabric managed by the SDN controller; and
 wherein the SDN controller is configured to configure, via the first management switch, the fabric network device with the controller virtual network to enable communications, via the controller virtual network, between the first control host and a compute node or a storage node connected to the fabric network device.

15. The system of claim 1, further comprising the fabric network device, wherein the fabric network device comprises one or more of a leaf switch, a chassis switch, or a gateway.

16. The system of claim 14, further comprising the compute node installed in the first rack.

17. The system of claim 14, further comprising the storage node installed in the first rack.

18. The system of claim 14, further comprising a provisioning host installed in the first rack and configured to provision the compute node and the storage node.

19. The system of claim 14, further comprising a third control host installed in a third rack, wherein the first control host, the second control host, and the third control host are configured to execute the controller nodes that implement the SDN controller using the controller virtual network, wherein the controller virtual network extends between the first rack, the second rack, and the third rack.

20. A non-transitory computer-readable medium comprising instructions for causing one or more processors to:
 with a first control host installed in a first rack having a first management switch and a second control host installed in a second rack, execute controller nodes that implement a software-defined networking (SDN) controller using a controller virtual network extending between the first rack and the second rack,
 wherein the first management switch is configured to route traffic between the controller virtual network and a device management network extending from the first management switch to a fabric network device of the fabric managed by the SDN controller; and
 configure, with the SDN controller, via the first management switch, the fabric network device with the controller virtual network to enable communications, via the controller virtual network, between the first control host and a compute node or a storage node connected to the fabric network device.

* * * * *